United States Patent
Bäumchen et al.

(10) Patent No.: US 11,208,940 B2
(45) Date of Patent: Dec. 28, 2021

(54) PROCESS FOR MANUFACTURING A MUFFLER

(71) Applicant: Eberspächer Exhaust Technology GmbH & Co. KG, Neunkirchen (DE)

(72) Inventors: Carsten Bäumchen, Oberthal (DE); Fritz Strobl, Prichsenstadt (DE)

(73) Assignee: Purem GmbH, Neunkirchen (DE)

( * ) Notice: Subject to any disclaimer, the term of this patent is extended or adjusted under 35 U.S.C. 154(b) by 130 days.

(21) Appl. No.: 16/354,819

(22) Filed: Mar. 15, 2019

(65) Prior Publication Data

US 2019/0292972 A1 Sep. 26, 2019

(30) Foreign Application Priority Data

Mar. 20, 2018 (DE) ...................... 10 2018 106 429.2

(51) Int. Cl.
| | | |
|---|---|---|
| *F01N 13/18* | (2010.01) | |
| *B23K 33/00* | (2006.01) | |
| *F01N 13/00* | (2010.01) | |
| *B23K 101/04* | (2006.01) | |

(52) U.S. Cl.
CPC ............ *F01N 13/18* (2013.01); *B23K 33/002* (2013.01); *F01N 13/00* (2013.01); *B23K 2101/04* (2018.08)

(58) Field of Classification Search
CPC ...... F01N 13/18; F01N 13/00; F01N 13/1894; B23K 33/002; B23K 2101/04
See application file for complete search history.

(56) References Cited

U.S. PATENT DOCUMENTS 5,701,737 A * 12/1997 Branik ................ F01N 13/1872
60/299
2006/0124384 A1* 6/2006 Tary ........................ F01N 13/18
181/243

FOREIGN PATENT DOCUMENTS

| CA | 2 443 427 A1 | 3/2005 |
| CN | 101010496 A | 8/2007 |
| CN | 204511602 U | 7/2015 |
| DE | 4316870 C2 | 7/1997 |
| DE | 103 58 504 A1 | 7/2005 |
| DE | 10 2004 037 480 A1 | 3/2006 |
| EP | 0136120 A2 | 4/1985 |
| EP | 2 131 015 A1 | 12/2009 |
| FR | 2 902 138 A1 | 12/2007 |
| WO | 2006/015730 A1 | 12/2006 |
| WO | 2008025920 A1 | 3/2008 |

* cited by examiner

*Primary Examiner* — Lawrence Averick

(74) *Attorney, Agent, or Firm* — McGlew and Tuttle, P.C.

(57) ABSTRACT

A process for manufacturing a muffler for an exhaust system of an internal combustion engine, provides a manufactured muffler with a muffler housing with a housing jacket (14) that is elongated in a direction of a housing longitudinal axis and with at least one housing bottom (26) carried on the housing jacket (14). The process includes the steps of providing the housing jacket (14) with a stop formation (50) in association with at least one housing bottom (26) to be carried on the housing jacket (14), providing the at least one housing bottom (26) to be carried on the housing jacket (14), and positioning the at least one housing bottom (26) on the housing jacket (14) such that the housing bottom (26) is in contact with the stop formation (50) associated with the housing bottom (26).

17 Claims, 1 Drawing Sheet

PROCESS FOR MANUFACTURING A MUFFLER

CROSS REFERENCE TO RELATED APPLICATIONS

This application claims the benefit of priority under 35 U.S.C. § 119 of German Application 10 2018 106 429.2, filed Mar. 20, 2018, the entire contents of which are incorporated herein by reference.

TECHNICAL FIELD

The present invention pertains to a process for manufacturing a muffler for an exhaust system of an internal combustion engine and to a muffler for an exhaust system of an internal combustion engine.

BACKGROUND

Such a muffler is configured, in general, with a muffler housing, which comprises a housing jacket, which closes the interior of the muffler, through which interior exhaust gas can flow, radially to the outside in relation to a housing longitudinal axis and which provides essentially a circumferential wall. Housing bottoms providing outer bottoms, which close the interior of the muffler or of the muffler housing essentially in the direction of the housing longitudinal axis, are fixed to the housing jacket at the axial end areas of the housing jacket. For a permanent connection of these housing bottoms to the housing jacket, the housing bottoms are configured, in general, with a pot-like (pot-shaped) structure and have a bottom wall area oriented, for example, essentially at right angles to the housing longitudinal axis and, adjoining this radially on the outside, a connecting wall area, which is, for example, essentially cylindrical. This connecting wall area is inserted into an end section of the housing jacket and is fixed thereto gas-tightly by a weld seam extending in the circumferential direction.

There is a problem in connection with the manufacture of a muffler having such a configuration in that a defined positioning of the housing bottoms in relation to the housing jacket can only be preset by means of tools or holding devices positioned outside the muffler housing during the manufacture of the muffler, especially also while the welding operation is being carried out for fixing the housing bottoms to the housing jacket. However, this implies the risk that a housing bottom will be displaced in relation to the housing jacket, especially into the interior of the housing jacket, and it will not thus be fixed in the correct position to the housing jacket in relation to the housing jacket.

SUMMARY

An object of the present invention is to provide a process for manufacturing a muffler for an exhaust system of an internal combustion engine and to provide a muffler for such an exhaust system, in which process and muffler a defined positioning of one or more housing bottoms can be preset in relation to a housing jacket of a muffler housing with simple steps.

This object is accomplished according to the present invention by a process for manufacturing a muffler for an exhaust system of an internal combustion engine, wherein the muffler to be manufactured comprises a muffler housing with a housing jacket elongated in the direction of a housing longitudinal axis and at least one housing bottom carried on the housing jacket, comprising the steps of a) providing the housing jacket with a stop formation in association with at least one housing bottom to be carried on the housing jacket, b) providing at least one housing bottom to be carried on the housing jacket, and c) positioning at least one housing bottom on the housing jacket such that the housing bottom is in contact with the stop formation associated therewith.

By providing such a stop formation in association with at least one housing bottom, it becomes possible to preset a correspondingly defined positioning for the housing bottom being supported hereon especially in the direction of the housing longitudinal axis of the muffler housing due to the positioning of the stop formation. It is thus possible, above all, to prevent an undefined displacement of a muffler bottom into the interior of the housing, which can only be prevented with great effort and to a limited extent only by means of holding tools to be provided outside the muffler housing to be manufactured.

It is proposed for holding a housing bottom at the housing jacket in a stable manner that a step d) be carried out, after step c), for fixing at least one housing bottom that is in contact with a stop formation to the housing jacket.

To also guarantee a defined positioning of a housing bottom to be fixed to the housing jacket during the operation for fixing the housing bottom to the housing jacket, provisions may further be made for the housing bottom to be held in contact with the stop formation associated with it while step d) is being carried out.

A stable connection, which is especially also gas-tight, can be achieved by the housing bottom being fixed to the housing jacket by connection in substance, preferably welding, during step d).

At least one stop formation may comprise a plurality of stop projections, which are arranged at spaced locations from one another about the housing longitudinal axis in the circumferential direction and which project into a housing interior enclosed by the housing jacket. A plurality of support points are thus provided for the housing bottom held in a defined position in this manner.

For example, at least one stop projection and preferably each stoop projection may be provided in at least one stop formation by a preferably pot-like (pot-shaped) bulge directed towards the housing interior in the housing jacket.

It is proposed in another type of configuration that at least one stop projection and preferably each stop projection be provided by a positioning pin passing through an opening in the housing jacket in at least one stop formation.

To guarantee that the positioning pins projecting, in general, outwards over the housing jacket during the carrying out of step d) will not interfere with other components after completion of a muffler, it is further proposed that after carrying out step d), all the positioning pins associated with a housing bottom fixed to the housing jacket in step c) be removed from the openings receiving them and that the openings be closed.

A closure that is especially also gas-tight can now be achieved in a simple manner by at least one opening and preferably each opening being closed by connection in substance, preferably by welding, or/and by at least one opening and preferably each opening being closed by a closing element, preferably a closing rivet.

In another embodiment variant according to the present invention, at least one stop formation may be provided by at least one beaded bulge, which extends about the housing longitudinal axis in at least some areas and projects into a housing interior enclosed by the housing jacket.

At least one housing bottom, which is to be carried on the housing jacket, may be provided in step b), with a bottom wall area and with an essentially cylindrical connecting wall area adjoining the bottom wall area in an outer circumferential area, and the housing bottom may be positioned with its connecting wall area in contact with the stop formation in step c). The axial overlap of essentially cylindrical wall areas, which overlap is thus generated, supports the stable holding of a housing bottom at the housing jacket.

This can further be supported by the housing bottom being fixed in the area of its connecting wall area to the housing jacket in step d).

In step a), the housing jacket may be provided with a radial expansion area in at least one axial end area and, adjoining the radial expansion area, with an essentially cylindrical end section for receiving a housing bottom. A stop formation may now be provided in the radial expansion area or/and in the end section of the housing jacket.

For a configuration of the muffler housing that can be embodied in a structurally simple manner, the housing jacket may be provided in step a) with two jacket shells, which are to be positioned such that they adjoin each other in connection areas extending, for example, essentially in the direction of the housing longitudinal axis.

At least one housing bottom may be provided in step b) as an outer bottom closing the housing interior enclosed by the housing jacket in the direction of the housing longitudinal axis. Further, at least one housing bottom may be provided in step b) with at least one opening for receiving an exhaust gas pipe. It should be noted that the principles of the present invention may also be applied when fixing housing bottoms, which provide inner bottoms of the muffler housing and which separate from each other chambers, which are provided in the interior of the muffler housing and are formed, for example, in it.

A step e) for fixing an exhaust gas pipe to a housing bottom may be carried out after step d).

The present invention further pertains to a muffler for an exhaust system of an internal combustion engine, comprising a muffler housing with a housing jacket elongated in the direction of a housing longitudinal axis and with at least one housing bottom carried on the housing jacket, wherein at least one stop formation is provided on the housing jacket for supporting a housing bottom essentially in the direction of the housing longitudinal axis.

It should be noted that such a muffler having the above-described structural features, which are specific for the configuration of a muffler, may also be configured with any one of these features or with any combination of these features.

For example, such a muffler may be configured such that the stop formation comprises a plurality of stop projections, which are arranged at spaced locations from one another in the circumferential direction about the housing longitudinal axis and project into a housing interior enclosed by the housing jacket.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
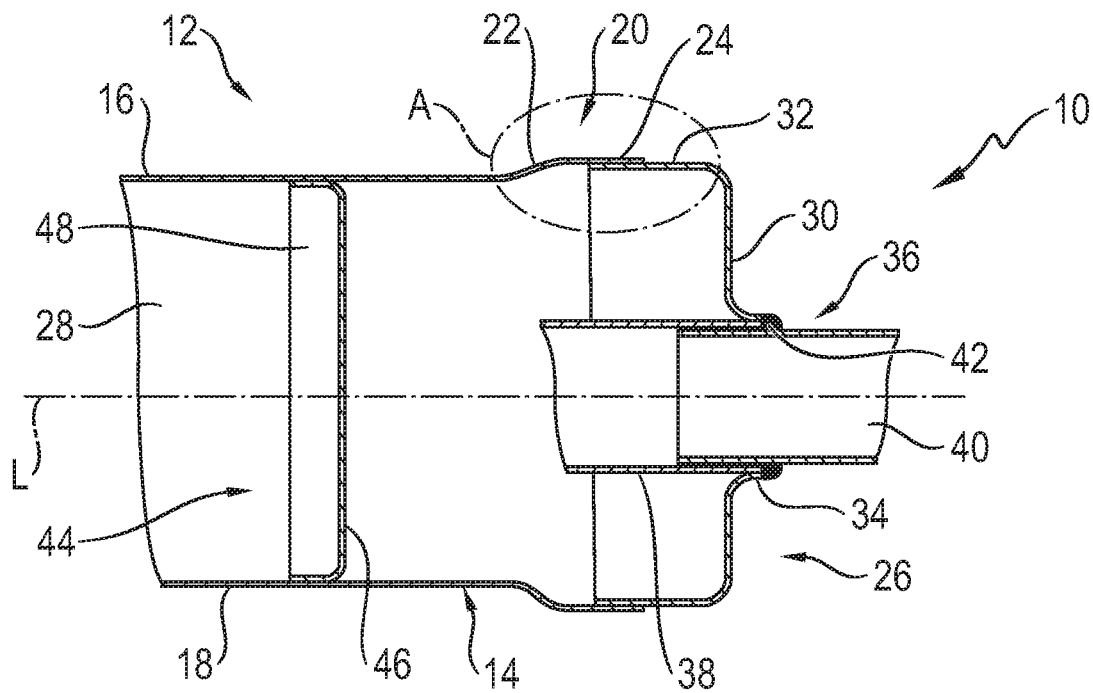
FIG. 1 is a schematic sectional view showing a muffler configured with a muffler housing for an exhaust system of an internal combustion engine.

In a partial schematic diagram, FIG. 1 shows a muffler, generally designated by 10, for an exhaust system of an internal combustion engine, for example, of a motor vehicle. The muffler 10 comprises a muffler housing 12 with a housing jacket 14 providing a circumferential wall. The housing jacket 14 may be configured, for example, with two jacket shells 16, 18, which are provided as shaped sheet metal parts and which can adjoin each other in connection areas extending essentially in the direction of a housing longitudinal axis L.

In the axial end area 20 seen in the right-hand part of FIG. 1, the housing jacket 14 is configured with a radial expansion area 22 and with an essentially cylindrically shaped end section 24 adjoining it. A housing bottom, which is generally designated by 26 and provides an outer bottom of the muffler housing 12, meshes with this end section 24 of the housing jacket 14. The housing bottom 26, which closes the interior 28 of the muffler housing 12, which interior is defined radially outwards by the housing jacket 14, in the direction of the housing longitudinal axis L, is configured with a bottom wall area 30 and, adjoining this radially on the outside, with an essentially cylindrically shaped connecting wall area 32. The housing bottom 26 is preferably also provided as a shaped sheet metal part and may have an opening 36 formed by a deformed area 34, which is directed, for example, radially outwards. The deformed area 34 may be provided, for example, as a passage. An inner pipe 38, which extends in the interior 28 and is open to one or more chambers formed in the muffler housing 12, is received in the deformed area 34, for example, such that this inner pipe 38 ends essentially flush with the bulge area 34 in the direction of the housing longitudinal axis L. An exhaust gas pipe 40 may be inserted into the inner pipe 38 from the outside and fixed to the housing bottom 26 in a gas-tight manner by a weld seam 42 together with the inner pipe 38. It should be noted that the opening 36 may also be provided in another position of the housing bottom 26, that a plurality of such openings may be provided on the housing bottom 26 for receiving an exhaust gas pipe or that such a housing bottom 26 may be configured entirely without an opening for receiving an exhaust gas pipe.

One or more housing bottoms 44 configured as inner walls may be provided in the interior 28 of the muffler housing 12. Just like the housing bottom 26 configured as an outer bottom, these housing bottoms 44 may also be configured with a bottom wall area 46 and with a connecting wall area 48, which is in contact on the inside with the housing jacket 14. The interior 28 of the muffler housing 12 is divided into a plurality of chambers by one or more such housing bottoms 44 acting as inner bottoms. These chambers may be in connection with one another via the inner pipe 38 or via one or more additional inner pipes or via openings provided in a respective housing bottom 44.

When manufacturing such a muffler 10, the components to be arranged in the interior 28 were first positioned, for example, in the area of one of the jacket shells 16, 18. The other of these two jacket shells 16, 18 can then be placed thereon. Before or after the second housing shell is placed on in this manner, the housing bottoms to be provided in the two respective end areas, i.e., especially also the housing bottom 26 shown in FIG. 1, can be positioned in the two end areas such that the connecting wall area 32 overlaps the end section 24 of the housing jacket 14 in the direction of the housing longitudinal axis L. The housing bottom 26 or each housing bottom acting as an outer bottom is then fixed by a weld seam extending in the circumferential direction in the area of its connecting wall area 32 to the end section 24 of the housing jacket 14.

Figure 2:
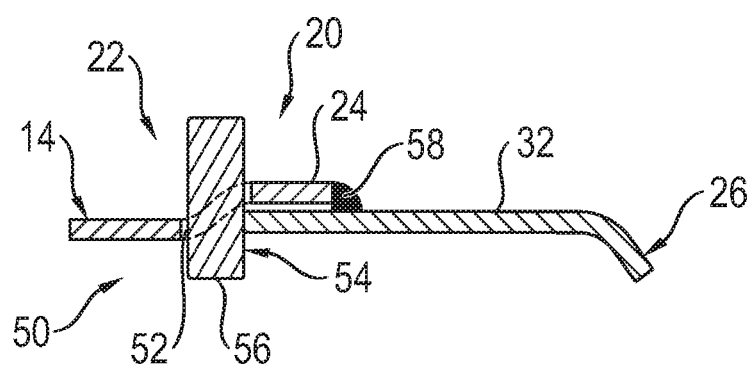
FIG. 2 is an enlarged view of detail A of FIG. 1 during the manufacture of the muffler.
Figure 3:
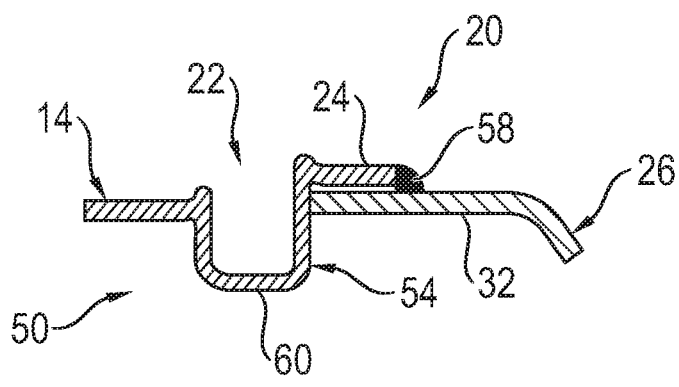
FIG. 3 is a sectional view, corresponding to FIG. 2, of an alternative embodiment.

With reference to FIGS. 2 and 3, steps will be described below, with which it is ensured that a defined positioning of the respective housing bottoms 26 and 44 to be provided at the housing jacket 14 can be guaranteed during the assembly of the muffler housing 12.

In an enlarged view, FIG. 2 shows the area in which the connecting wall area 32 of the housing bottom 26 extends into the end section 24 of the housing jacket 14. To prevent an excessively wide displacement of the housing bottom 26 into the interior 28 of the muffler housing 12, a stop formation, generally designated by 50, is provided. In the example being shown, this comprises in the radial expansion area 22 of the housing jacket 14 a plurality of, preferably at least three, openings 52, which are distributed in the circumferential direction about the housing longitudinal axis L, and through which positioning pins 56 providing respective stop projections 54 are led. The openings 52 and the positioning pins 56 may be dimensioned such that the positioning pins 56 inserted into the openings 52 are held therein by press fit, i.e., by frictional engagement.

After providing the housing jacket 14, possibly with the assembly units to be received in the interior 28, and with the stop formation 50, which is to be provided thereon and which comprises the positioning pins 56, and after providing the housing bottom 26 in such a manner that, for example, the inner pipe 38 is already inserted into the bulge 34 and is held therein, for example, by press fit, but it is not yet fixed to the housing bottom 26, the housing bottom 26 is positioned in the end area 20 of the housing jacket 14 such that the connecting wall area 32 is supported at the positioning pins 56 in the direction of the housing longitudinal axis L. The housing bottom 26 is held in this manner in a defined position in relation to the housing jacket 14 and the housing bottom 26 is prevented from being inserted excessively far into the housing jacket 14. The housing bottom 26 is kept in contact with the positioning pins 56 of the stop formation 50 by a force, which is applied from the outside, is also oriented in the direction of the housing longitudinal axis L and is provided, for example, by a corresponding holding tool. The weld seam 58, which preferably extends completely about the housing longitudinal axis L, is then formed in this state in order to thereby fix the housing bottom 26 to the housing jacket 14. A corresponding procedure may be carried out in the other end area of the housing jacket 14, which end area is not shown in FIG. 1, with the housing bottom to be fixed there to the housing jacket 14.

After fixing the housing bottom or the housing bottoms to the housing jacket 14, the exhaust gas pipe 40 can then be inserted, for example, into the housing bottom 26 such that it extends into the inner pipe 38. The exhaust gas pipe 40 can be fixed by the weld seam 42 to be created subsequently together with the inner pipe 38 to the bulge 34 of the bottom wall area 30.

In a next operation, the positioning pins 56 can be removed from the openings 52 receiving them. To prevent the discharge of exhaust gas, the openings 52 are closed in a gas-tight manner. This may be carried out, for example, by applying weld material, i.e., by connection in substance. As an alternative or in addition, the openings 52 may be closed by gas-tight and liquid-tight rivets, especially blind rivets.

An alternative embodiment is shown in FIG. 3. The stop formation 50 comprises in this embodiment, for example, in the radial expansion area 22 of the housing jacket 14, a plurality of stop projections 54, which follow each other in the circumferential direction and are provided by pot-like (pot-shaped) bulges 60. These pot-like bulges 60 can be prepared during the shaping of a metal sheet blank to manufacture the jacket shells 16, 18 of the housing jacket 14. The housing bottom 26 can be positioned at these stop projections 54 provided by the pot-like bulges 60 such that it supports itself with its connecting wall area 32, so that the weld seam 58 can subsequently be created in a connection operation for the permanent and gas-tight connection of the housing bottom 26 to the housing jacket 14. Since the pot-like bulges 60 have no opening, no additional operation is necessary for producing a tight closure in this embodiment variant.

It should finally be noted that one or more housing bottoms 44 configured as inner bottoms can also be positioned by such stop formations in a defined manner in relation to the housing jacket 14. Such stop formations 50, for example, with positioning pins 56 or with pot-like bulges 60, may be provided for this purpose in the axial areas of the housing jacket 14 and of the housing shells 16, 18 thereof, respectively, where a respective housing bottom 44 is to be positioned in the interior 28. It is possible, if necessary, to provide two such stop formations 50 in association with such a housing bottom 44 to be arranged in the interior 28 in order to support this housing bottom 44 in both axial directions in a defined manner.

It should further be noted that the shapes and positions of the stop projections 54 shown in FIGS. 2 and 3 are only shown as examples. For example, the stop projections 54 could thus also be positioned in the essentially cylindrically shaped end section 24 of the housing jacket 14. In case the bulges 60 are configured as being directed into the interior 28, these may have a different structure, for example, a conical or frustoconical structure. Such bulges could, in principle, also be provided as grooved or beaded depressions extending in the circumferential direction in at least some sections.

It becomes possible with structurally simple steps with the configuration of a muffler according to the present invention and of the procedure according to the present invention for manufacturing such a muffler to guarantee a defined positioning of the components to be connected to one another, namely, the housing jacket and the housing bottoms, and thus to provide true-to-size manufacture. As a result, the rejects generated during the manufacture of mufflers and the extent of necessary finishing operations can be markedly reduced. Subsequent processes, e.g., the mounting of brackets on the housing bottoms or the above-described fixation of exhaust gas pipes in the area of openings in housing bottoms, can also be carried out in a simple and defined manner.

While specific embodiments of the invention have been shown and described in detail to illustrate the application of the principles of the invention, it will be understood that the invention may be embodied otherwise without departing from such principles.

What is claimed is:

1. A process for manufacturing muffler for an exhaust system of an internal combustion engine,
wherein the muffler to be manufactured comprises a muffler housing with a housing jacket elongated in a direction of a housing longitudinal axis and with at least one housing bottom carried on the housing jacket,
the process comprising the steps of:
providing the housing jacket with a stop formation in association with the at least one housing bottom to be carried on the housing jacket,
wherein the at least one housing bottom is provided as an outer bottom,
which outer bottom closes a housing interior enclosed by the housing jacket in the direction of the housing longitudinal axis and is provided with at least one opening for receiving an exhaust gas pipe;
positioning the at least one housing bottom on the housing jacket such that the housing bottom is in contact with the stop formation associated with the at least one housing bottom
fixing the at least one housing bottom,
that is in contact with the stop formation,
to the housing jacket; and
fixing an exhaust gas pipe to a housing bottom subsequent to the step of fixing the at least one housing bottom,
that is in contact with the stop formation,
to the housing jacket.

2. The process in accordance with claim 1,
further comprising fixing the at least one housing bottom, that is in contact with a stop formation,
to the housing jacket after the step of positioning the at least one housing bottom on the housing jacket is carried out.

3. The process in accordance with claim 2,
wherein after fixing the at least one housing bottom,
that is in contact with a stop formation,
to the at least one housing jacket the housing bottom is:
in contact with the stop formation associated with the at least one housing jacket;
or fixed by a connection in substance;
or in contact with the stop formation associated with the at least one housing jacket and fixed by a connection in substance.

4. The process in accordance with claim 2, wherein:
at least some of the stop projections are provided in the at least one stop formation by positioning pins passing through respective openings in the housing jacket; and
all of the positioning pins pin associated with the at least one housing bottom and fixed to the housing jacket are removed from the openings receiving the respective positioning pins and the openings are closed.

5. The process in accordance with claim 4, wherein:
at least one of the openings is closed by a connection in substance; or
at least one of the openings is closed by a closing element; or
at least one of the openings is closed by a connection in substance and at least one of the openings is closed by a closing element.

6. The process in accordance with claim 2,
wherein the at least one housing bottom that is in contact with a stop formation to the housing jacket is fixed to the housing jacket in an area of the connecting wall area to the housing jacket.

7. The process in accordance with claim 1,
wherein at least one of the stop projections is provided in at least one stop formation by a pot-shaped bulge directed towards the housing interior.

8. The process in accordance with claim 1,
wherein at least one of the stop projections is provided in the at least one stop formation by a positioning pin passing through an opening in the housing jacket.

9. The process in accordance with claim 1,
wherein the stop formation is provided by a beaded bulge extending in a circumferential direction about the housing longitudinal axis in at least some areas and projects into a housing interior enclosed by the housing jacket.

10. The process in accordance with claim 1, wherein:
the at least one housing bottom to be carried on the housing jacket is provided with a bottom wall area and with an essentially cylindrical connecting wall area,
which connecting wall area adjoins the bottom wall area in an outer circumferential area, and
the housing bottom is positioned with the connecting wall area such that the housing bottom is in contact with the stop formation.

11. The process in accordance with claim 1,
wherein the step of providing the housing jacket with a stop formation includes providing two jacket shells, which are to be positioned such that the two jacket shells adjoin each other in connection areas.

12. The process in accordance with claim 1, wherein:
the at least one stop formation comprises a plurality of stop projections arranged at spaced locations from one another about the housing longitudinal axis in a circumferential direction; and
the plurality of stop projections project into a housing interior enclosed by the housing jacket.

13. The process in accordance with claim 1, wherein:
the step of providing the housing jacket with a stop formation includes providing the housing jacket with at least one axial end area with a radial expansion area and adjoining the radial expansion area with an essentially cylindrical end section for receiving the housing bottom;
the stop formation is provided in the radial expansion area or the stop formation is provided in the end section of the housing jacket or the stop formation is provided in the radial expansion area and in the end section of the housing jacket.

14. A process for manufacturing a muffler for an exhaust system of an internal combustion engine, wherein the muffler to be manufactured comprises a muffler housing with a housing jacket elongated in a direction of a housing longitudinal axis and with at least one housing bottom carried on the housing jacket, the process comprising the steps of:
providing the housing jacket with a stop formation associated with the at least one housing bottom to be carried on the housing jacket, the housing jacket comprising a jacket housing end area, the jacket housing end area comprising a first housing jacket portion and a second housing jacket portion, the second housing jacket portion defining an essentially cylindrical end for receiving the at least one housing bottom, the first housing jacket portion comprising a first housing jacket portion first area and a first housing jacket portion second area, at least a part of the first housing jacket portion second area being located adjacent to the second housing jacket portion, the first housing jacket portion second area being located between the second housing jacket portion and the first housing jacket portion first area, the first housing jacket portion first area being located at a first radial distance from the housing longitudinal axis, the first housing jacket portion second area being located at a second radial distance from the housing longitudinal axis, the second radial distance being greater than the first radial distance, wherein the first housing jacket portion defines a radial expansion area of the housing jacket, the stop formation comprising a plurality of stop projections arranged at spaced locations from one another about the housing longitudinal axis in a circumferential direction and projecting into a housing interior enclosed by the housing jacket in the radial expansion area;

providing the at least one housing bottom to be carried on the housing jacket; and positioning the at least one housing bottom on the housing jacket such that the housing bottom is in contact with the stop formation associated with the at least one housing bottom.

15. A process in accordance with claim 14, wherein:

the at least one housing bottom is provided as an outer bottom, which outer bottom closes a housing interior enclosed by the housing jacket in the direction of the housing longitudinal axis or the at least one housing bottom is provided with at least one opening for receiving an exhaust gas pipe; or the at least one housing bottom is provided as an outer bottom, which outer bottom closes a housing interior enclosed by the housing jacket in the direction of the housing longitudinal axis and is provided with at least one opening for receiving an exhaust gas pipe.

16. A process in accordance with claim 15, further comprising:

fixing the at least one housing bottom, that is in contact with the stop formation, to the housing jacket; and fixing an exhaust gas pipe to a housing bottom subsequent to the step of fixing the at least one housing bottom, that is in contact with a stop formation, to the housing jacket.

17. A process in accordance with claim 14, further comprising:

fixing the at least one housing bottom, that is in contact with the stop formation, to the housing jacket; and fixing an exhaust gas pipe to a housing bottom subsequent to the step of fixing the at least one housing bottom, that is in contact with a stop formation, to the housing jacket.

* * * * *